(12) United States Patent
Kaneuchi et al.

(10) Patent No.: US 10,875,280 B2
(45) Date of Patent: Dec. 29, 2020

(54) WOODEN DECORATIVE PANEL AND METHOD FOR MANUFACTURING SAME, INSERT MOLDING USING WOODEN DECORATIVE PANEL, AND METHOD FOR MANUFACTURING INSERT MOLDING

(71) Applicant: Panasonic Intellectual Property Management Co., Ltd., Osaka (JP)

(72) Inventors: Kazuhiko Kaneuchi, Osaka (JP); Tomonori Sugiyama, Osaka (JP); Takeshi Kiritoshi, Osaka (JP); Hideaki Nakagawa, Osaka (JP); Teppei Asada, Kyoto (JP); Shin Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/139,640

(22) Filed: Sep. 24, 2018

(65) Prior Publication Data

US 2019/0100053 A1    Apr. 4, 2019

(30) Foreign Application Priority Data

Oct. 2, 2017    (JP) .................. 2017-192319

(51) Int. Cl.
*B32B 21/14*    (2006.01)
*B44C 5/04*    (2006.01)
(Continued)

(52) U.S. Cl.
CPC ........ *B32B 21/14* (2013.01); *B29C 45/14811* (2013.01); *B32B 21/042* (2013.01);
(Continued)

(58) Field of Classification Search
None
See application file for complete search history.

(56) References Cited

U.S. PATENT DOCUMENTS 6,025,064 A    2/2000  Kawata et al.
7,435,453 B2   10/2008  Chen et al.
(Continued)

FOREIGN PATENT DOCUMENTS

JP    07-290670    11/1995
JP    07-329268    12/1995
(Continued)

OTHER PUBLICATIONS

Kato, Y. et al., Wood Decorative Plate and Its Manufacturing Method, Mar. 4, 2010, machine translation of JP2010-046866 (Year: 2010).*

*Primary Examiner* — Chinessa T. Golden
(74) *Attorney, Agent, or Firm* — Wenderoth, Lind & Ponack, L.L.P.

(57) ABSTRACT

A wooden decorative panel has rough texture and non-glossy look of veneer. A wooden decorative panel manufacturing method enables manufacture of the wooden decorative panel with a small material loss. The wooden decorative panel includes a veneer made from natural wood and having a plurality of surface irregularities due to vessels of the wood, and a transfer layer transferred from a transfer film and bonded to a surface of the veneer. The transfer layer has surface irregularities that are similar in shape to the plurality of surface irregularities. The wooden decorative panel has the feel and the appearance of natural veneer due to the irregularities formed by the vessels, and the durability sufficient for use as an industrial product.

14 Claims, 5 Drawing Sheets

(51) Int. Cl.
  *B29C 45/14* (2006.01)
  *E04C 2/16* (2006.01)
  *B32B 21/04* (2006.01)
  *E04C 2/00* (2006.01)
  *B32B 7/12* (2006.01)
  *B44C 1/17* (2006.01)

(52) U.S. Cl.
  CPC ............ *B44C 5/043* (2013.01); *B44C 5/0453* (2013.01); *E04C 2/16* (2013.01); *B32B 7/12* (2013.01); *B32B 2451/00* (2013.01); *B44C 1/1712* (2013.01); *E04C 2002/005* (2013.01)

(56) References Cited

U.S. PATENT DOCUMENTS

| | | | |
|---|---|---|---|
| 7,504,159 B1 | 3/2009 | Suare et al. | |
| 8,419,877 B2 | 4/2013 | Pervan et al. | |
| 2004/0209032 A1* | 10/2004 | Wani | B29C 45/0046 |
| | | | 428/57 |
| 2006/0029825 A1* | 2/2006 | Chen | B05D 7/08 |
| | | | 428/537.1 |

FOREIGN PATENT DOCUMENTS

| | | |
|---|---|---|
| JP | 10-323958 | 12/1998 |
| JP | 11-000983 | 1/1999 |
| JP | 2002-347177 | 12/2002 |
| JP | 2009-208289 | 9/2009 |
| JP | 2010-046866 | 3/2010 |
| JP | 2010046866 A * | 3/2010 |
| JP | 2012-045781 | 3/2012 |

\* cited by examiner

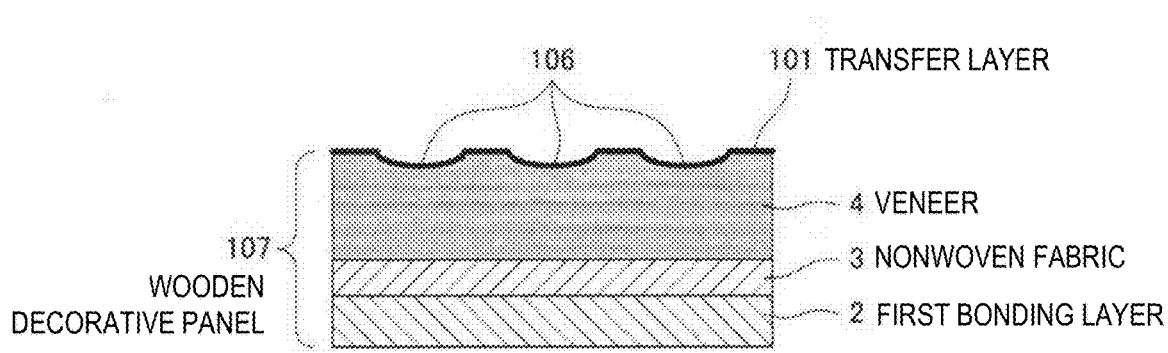
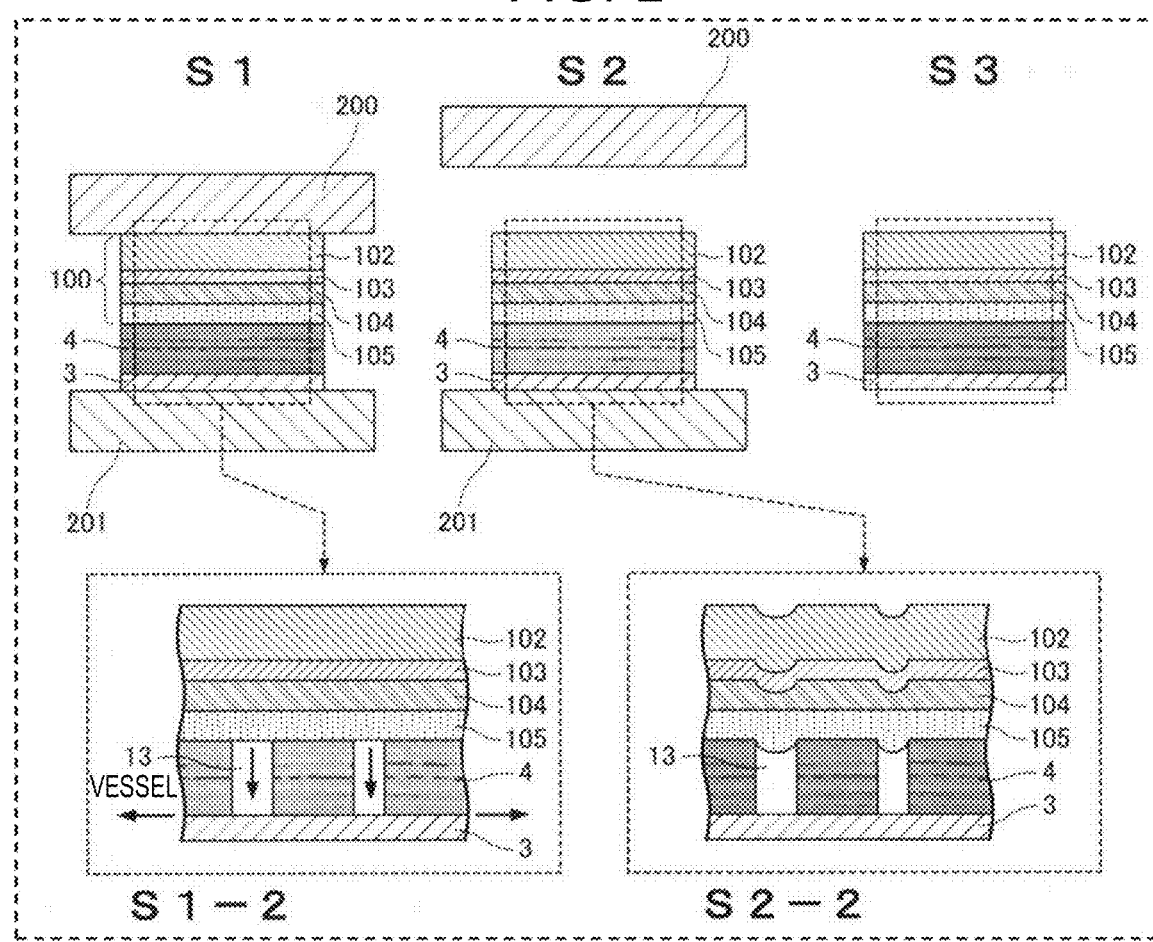

WOODEN DECORATIVE PANEL AND METHOD FOR MANUFACTURING SAME, INSERT MOLDING USING WOODEN DECORATIVE PANEL, AND METHOD FOR MANUFACTURING INSERT MOLDING

TECHNICAL FIELD

The technical field relates to a wooden decorative panel that uses thin veneer slices of natural wood, and to a method for manufacturing such a wooden decorative panel.

BACKGROUND

Increasingly diverse customer needs have created a demand for more expressive decorative designs in the exterior of home electronics, and the interior of automobiles. One such demand is a sophisticated design that uses veneer from natural wood to express luxury.

Various decorative techniques are available that use veneer, including a technique that attaches a veneer itself to a cabinet such as a molded component to decorate the exterior with a wooden decorative panel, and a technique in which a bonding layer that is adherent to an injection-molded resin, or some other functional layer equivalent of such a bonding layer is disposed in advance on a back surface of a veneer, and the molded resin layer is integrated with a wooden decorative panel by using a method such as injection molding, and vacuum molding.

FIG. 6 shows an insert molding 9 that uses a wooden decorative panel 8 of related art.

The insert molding 9 is configured from an injection-molded resin layer 1, and a wooden decorative panel 8. The wooden decorative panel 8 has a first bonding layer 2 provided between a veneer 4 and the injection-molded resin layer 1 to bond the injection-molded resin layer 1. The veneer 4 is a slice of natural wood with a nonwoven fabric 3 attached as a support, and the first bonding layer 2 is provided between the nonwoven fabric 3 and the injection-molded resin layer 1. A transparent film 6 for protecting the surface of the veneer 4 is attached to the surface of the veneer 4 opposite the nonwoven fabric 3, using a second bonding layer 5. A hardcoat layer 7 is formed on the surface of the transparent film 6 to add hardness. In JP-A-11-00983, the injection-molded resin layer 1 is formed into a single integrated unit by insert molding of the wooden decorative panel 8 molded with the first bonding layer 2 facing the injection-molded resin.

FIG. 7 shows an insert molding 12 with an open-pore wooden decorative panel 11 of related art.

Here, "open-pore wooden decorative panel" refers to a wooden decorative panel that is designed to have a surface in which the vessels of the veneer are open to the veneer surface. The wooden decorative panel 11 is combined with the injection-molded resin layer 1 by insert molding to make a molded product. A nonwoven fabric 3 is attached to one surface of the veneer 4 via a first bonding layer 2. On the surface of the veneer 4 opposite the nonwoven fabric 3 is formed a protective layer 10, which is a thin coating applied without hiding the surface irregularities formed by the vessels.

A molding using the traditional wooden decorative panels described in FIGS. 6 and 7 is problematic in the following respects. In the decorative technique for insert moldings, the hardcoat layer 7 is disposed as, for example, a 100 μm-thick transparent film on the surface of the veneer 4. This technique can successfully provide a luxurious decorative effect by providing a glossy look to the surface of the veneer 4, and providing a sense of depth attributed to the thickness of the transparent film. However, the irregularities formed by the vessels in the surface of the veneer 4 are not visible, and it is difficult to create the feel of veneer. As it currently stands, it is indeed difficult to replicate the texture of natural wood while ensuring reliability as an industrial product.

When the transparent film formed on the surface of the veneer 4 is a thick film including the hardcoat layer 7, because the veneer 4 and the transparent film have different mechanical properties such as elasticity, breaking or delamination tends to occur between the veneer 4 and the more easily stretchable thick transparent film when the veneer 4 is deformed in a molding process to be used as an industrial product, particularly when the extent of deformation and drawing is large. The protective layer 10, which is a rough-texture coating keeping the shape of the vessels present in the surface of the veneer 4, provides the feel of these irregularities. However, the protective layer 10 needs to be evenly coated on the surface of the veneer 4 to prevent orange peel, which makes the surface of the protective layer 10 uneven and rough when the protective layer 10 is improperly coated. This is indeed craftsmanship that requires know-hows and specialized knowledge and skills.

In the case of the insert molding 12, a coating step is required as a post process of molding, and, because of the extra step, the efficiency of coating application is poor, and the material loss is high. There is also difficulty in the quality management of clearly keeping the vessels formed in the surface of the veneer 4, and this tends to raise the manufacturing cost.

Another drawback of the post-process coating is that, while it keeps the irregularities created by the vessels in the surface of the veneer 4, the coating surface tends to be flat, and appears glossy. This spoils the natural non-glossy look of the veneer 4, and the product molded with the wooden decorative panel cannot have the same texture as natural wood. At present, it is accordingly not possible to stably make products that satisfy the natural feel and texture of a veneer sliced from natural wood while being durable enough for use as industrial products, without creating a large loss in industrial applications.

SUMMARY

The present disclosure is intended to provide a solution to the foregoing problems of the related art, and it is an object of the present disclosure to provide a wooden decorative panel having the rough texture and the non-glossy appearance of a veneer surface. The present disclosure is also intended to provide a method for stably manufacturing such a wooden decorative panel with high yield, without creating a large material loss.

According to an aspect of the present disclosure, there is provided a wooden decorative panel that includes:

a veneer made from natural wood and having a plurality of surface irregularities due to vessels of the wood; and a transfer layer transferred from a transfer film and bonded to a surface of the veneer, the transfer layer having surface irregularities that are similar in shape to the plurality of irregularities due to the vessels.

According to another aspect of the present disclosure, there is provided a method for manufacturing a wooden decorative panel, the method including:

placing a transfer layer-side of a transfer film on one surface of a veneer made from natural wood and having a plurality of surface irregularities due to vessels of the wood; and bonding the transfer layer of the transfer film to the surface of the veneer by heat press working so as to form irregularities in a surface of the transfer layer in a shape similar to the surface irregularities of the veneer due to the vessels of the wood.

According to another aspect of the present disclosure, there is provided a method for manufacturing an insert molding, the method comprising:

preforming by heat press working of the wooden decorative panel manufactured by:

placing a transfer layer-side of a transfer film on one surface of a veneer made from natural wood and having a plurality of surface irregularities due to vessels of the wood; and bonding the transfer layer of the transfer film to the surface of the veneer by heat press working so as to form irregularities in a surface of the transfer layer in a shape similar to the surface irregularities of the veneer due; and forming a molded resin layer by insert molding that injects resin to a first bonding layer or a functional bonding surface formed on the surface of the veneer opposite the surface on which the transfer layer is transferred, so as to obtain an insert molding having formed thereon the veneer that includes the transfer layer.

According to another aspect of the present disclosure, there is provided an insert molding that includes:

a wooden decorative panel formed by:

placing a transfer layer-side of a transfer film on one surface of a veneer made from natural wood and having a plurality of surface irregularities due to vessels of the wood; and bonding the transfer layer of the transfer film to the surface of the veneer by heat press working so as to form irregularities in a surface of the transfer layer in a shape similar to the surface irregularities of the veneer due to the vessels of the wood; and an injection-molded resin.

With the foregoing configurations, the surface conditions of the hardcoat layer or the protective layer transferred to the veneer surface can be finely adjusted in a range of glossiness from glossy to non-glossy solely by adjusting the roughness of the matte release layer of the transfer film. Because the surface conditions (e.g., glossiness and non-glossiness) of the hardcoat layer or the protective layer of the thin film can be finely adjusted as desired to meet customer needs while maintaining the natural feel of the irregularities present in veneer, the wooden decorative panel can be used to provide a molded component that can satisfy a wider range of customer needs than previously achieved.

With the wooden decorative panel and the method of manufacture thereof according to the aspects of the disclosure, a molding can be provided that has the natural feel and appearance of the surface irregularities of veneer, which has been difficult to achieve with traditional wooden decorative panels or with moldings decorated with a traditional wooden decorative panel. The disclosure has thus enabled low-cost and stable manufacture of a wooden decorative panel that has the quality of natural veneer with an appearance quality comparable to that of natural veneer, and that has the durability sufficient for use as an industrial product.

BRIEF DESCRIPTION OF THE DRAWINGS

FIG. 1 is a cross sectional view of a layer configuration of a wooden decorative panel of an embodiment.

FIG. 2 is an explanatory diagram representing a wooden decorative panel manufacturing method of an embodiment.

DESCRIPTION OF EMBODIMENTS

Embodiments of the present disclosure are described below with reference to the accompanying drawings.

Figure 6:
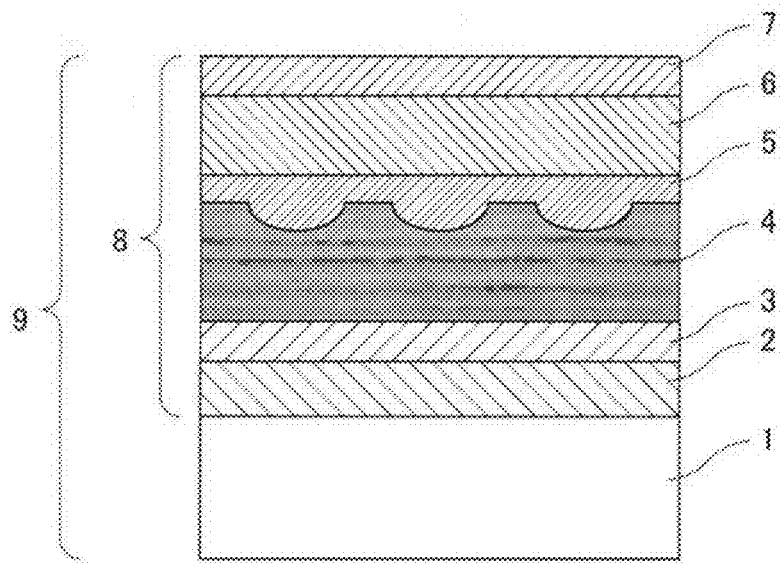
FIG. 6 is a cross sectional view of a layer configuration of a molding using a wooden decorative panel of related art.
Figure 7:
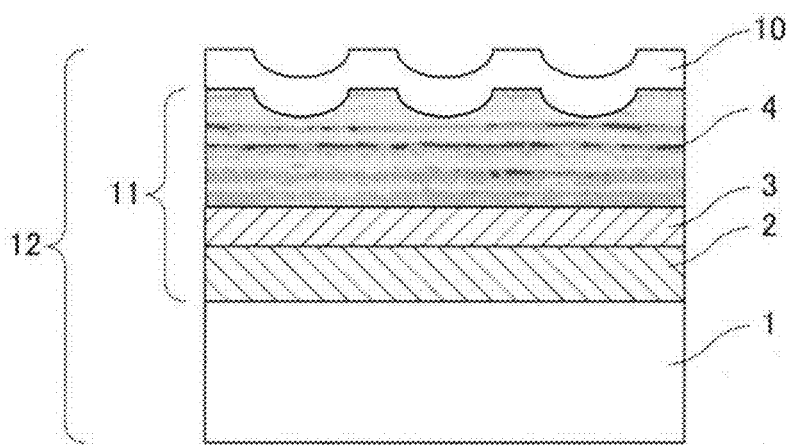
FIG. 7 is a cross sectional view of a layer configuration of a molding using an open-pore wooden decorative panel of related art.

In the following descriptions, the same constituting elements described in FIGS. 6 and 7 are given the same reference numerals.

First Embodiment

FIG. 1 to FIG. 4C represent First Embodiment of the present disclosure.

FIG. 1 is a cross sectional view showing a layer configuration of a wooden decorative panel 107 of an embodiment of the present disclosure.

The wooden decorative panel 107 can be fabricated by using the manufacturing process represented by S1 to S3 of FIG. 2. This manufacturing process uses the transfer film 100 shown in FIG. 3. FIGS. 4A to 4C represent a method for manufacturing an insert molding 110 using the wooden decorative panel 107 of the embodiment.

In the wooden decorative panel 107 of the embodiment of the present disclosure, a nonwoven fabric 3 is attached to a natural wood veneer 4. A first bonding layer 2 is provided on the surface of the nonwoven fabric 3 opposite the veneer 4. A transfer layer 101, having a uniform thickness much thinner than 100 μm, is provided on the surface of the veneer 4 opposite the nonwoven fabric 3. The transfer layer 101 has surface irregularities 106. The irregularities are similar in shape to the irregularities formed by vessels 13 in the surface of the veneer 4. The vessels 13 have an average diameter of about 100 to 200 μm. The transfer layer has a thickness of 4 μm to 30 μm.

Figure 3:
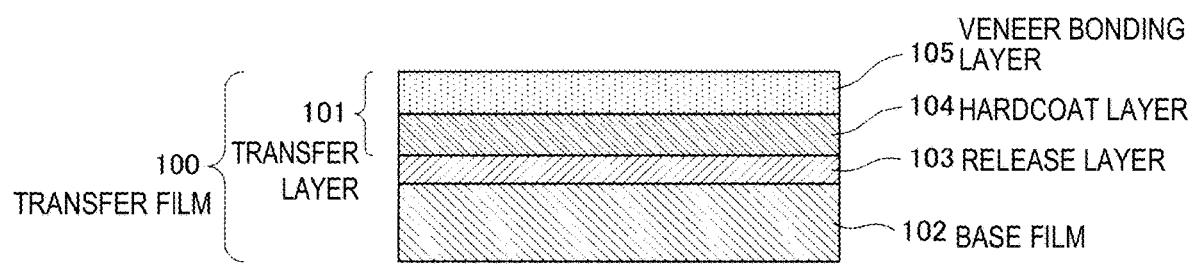
FIG. 3 is a cross sectional view of a layer configuration of a transfer film used in First Embodiment of the present disclosure.
Figure 4A:
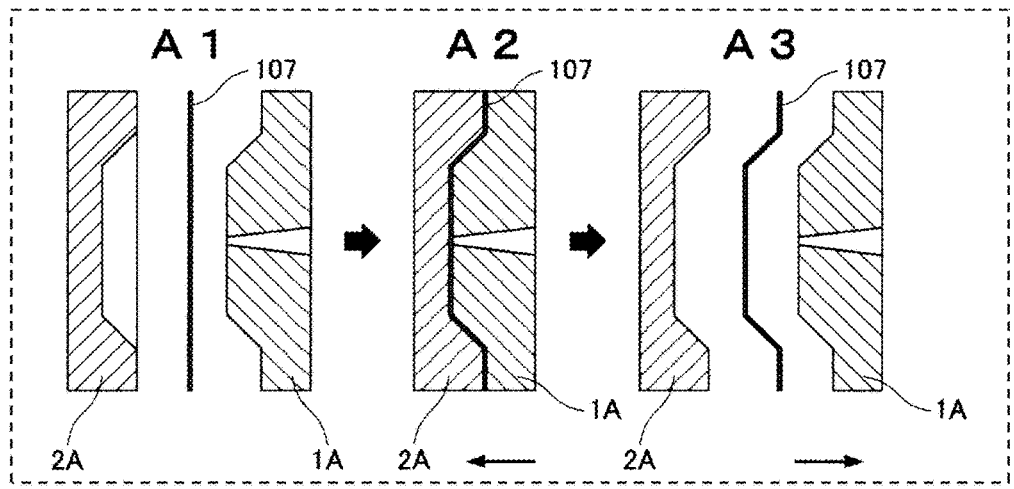
FIG. 4A is an explanatory diagram representing step A of an insert molding manufacturing method using the wooden decorative panel of the embodiment.
Figure 4B:
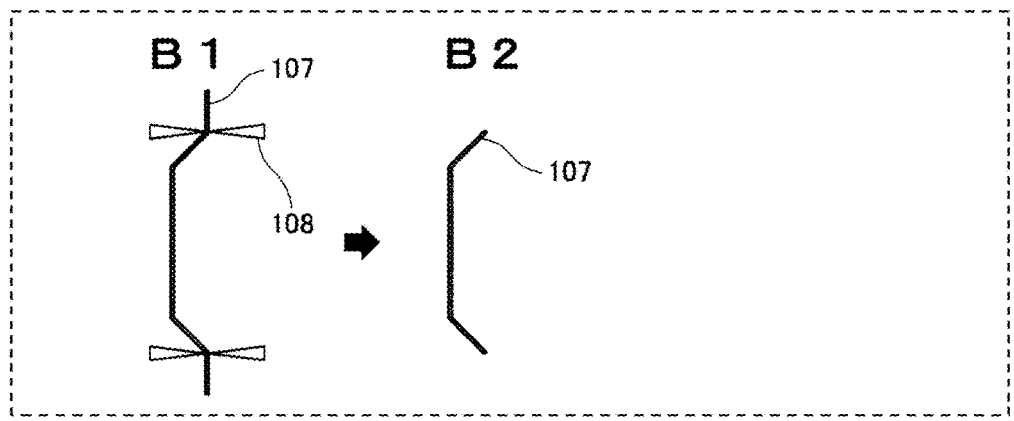
FIG. 4B is an explanatory diagram representing step B of an insert molding manufacturing method using the wooden decorative panel of the embodiment.
Figure 4C:
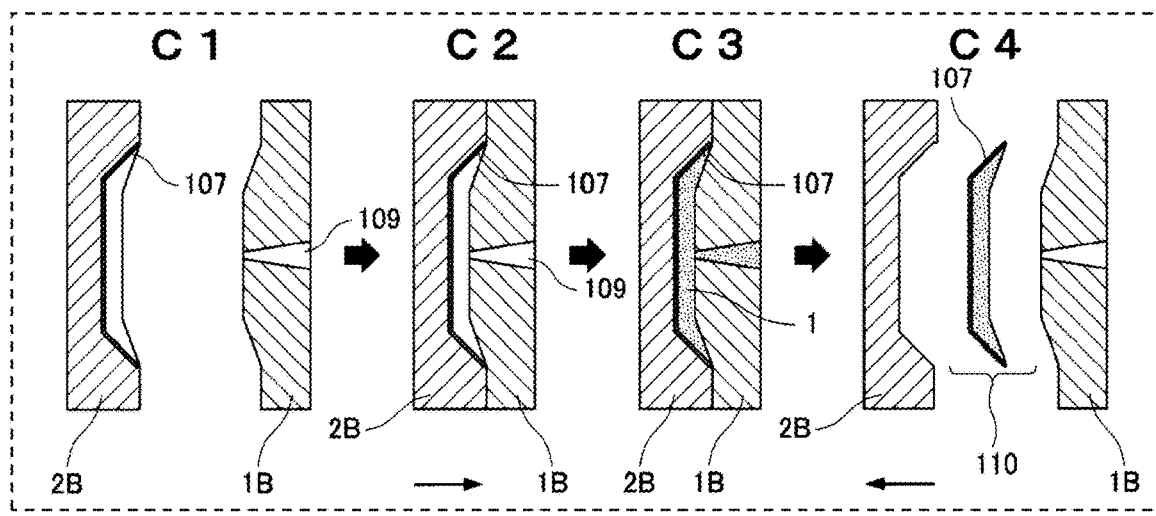
FIG. 4C is an explanatory diagram representing step C of an insert molding manufacturing method using the wooden decorative panel of the embodiment.

The transfer layer 101 is configured from a veneer bonding layer 105 and a hardcoat layer 104 of a transfer film 100, as illustrated in FIG. 3. In the transfer film 100, the hardcoat layer 104 is formed on a base film 102 via a release layer 103, and the veneer bonding layer 105 is formed on the hardcoat layer 104. This is described below in greater detail.

In the transfer film 100, the release layer 103 having formed thereon an irregular shape is formed on a surface of the base film 102. The hardcoat layer 104 is formed on the release layer 103. The veneer bonding layer 105 is formed on the hardcoat layer 104.

The roughness of the outermost surface of the transfer layer 101 to be transferred to the surface of the veneer 4 is adjusted by varying the surface roughness of the base film 102 on the side facing the transfer layer 101 of the transfer film 100, or by varying the surface roughness of the release layer 103 on the side facing the transfer layer 101 formed on the base film 102. Preferably, the surface roughness of the base film 102 on the side facing the transfer layer 101 of the transfer film 100, or the surface roughness of the release layer 103 on the side facing the transfer layer 101 formed on the base film 102 is smaller than the roughness of the irregularities formed by the vessels 13 in the surface of the veneer 4.

The transfer film 100 may be produced in the form of a continuous roll film, or in the form of a separate sheet. However, the transfer film 100 is typically produced in the form of a roll film because it is more productive. The base film 102 used has an average thickness of desirably 20 μm to 50 μm. In order to transfer the transfer film 100 to the veneer surface with improved conformity, the average thickness of the base film 102 is preferably 30 μm to 50 μm.

A base film 102 thinner than 20 μm is too thin because it causes poor handling due to the wrinkles, tear, or warping that occur when the release layer 103, the hardcoat layer 104, and the veneer bonding layer 105 are dried by heat or ultraviolet light during the formation of these layers on the base film 102 in producing the transfer film 100.

When the base film 102 is thicker than 50 μm, the transfer film cannot easily conform to its targeted object. Another issue arises when the base film 102 needs to be maintained instead of immediately being detached from the targeted object after the transfer of the transfer film 100. In this case, because the base film 102 contracts more than the veneer 4, the base film 102 pulls the veneer 4 as the base film 102 contracts. This impairs the handling of the wooden decorative panel.

A base film 102 thicker than 50 μm is also problematic because it increases the thickness and the weight of a film roll as compared to a roll of a thinner base film of the same roll length. This impairs the handling of the film such as when carrying the film, in addition to making the base film more expensive. The thickness of the base film 102 may be appropriately selected according to the intended use, and the thickness is not necessarily required to fall in the foregoing range, as long as the intended effect is obtained.

Typically, a PET or an acrylic film is used as the base film 102. However, the material is not particularly limited, as long as the same effect can be obtained.

The release layer 103 serves to release the hardcoat layer 104 and the veneer bonding layer 105 from the transfer film 100, and transfer these layers to the veneer 4. The release layer 103 may be, for example, a thermosetting melamine resin, a two-component curable urethane resin, or a thermosetting silicone resin. However, the material is not particularly limited, as long as it can produce the same effect as these materials.

Desirably, the release layer 103 is formed in an average thickness of 0.2 μm to 2 μm. With an average thickness of less than 0.2 μm, the release layer 103 cannot sufficiently develop its function as a release layer. When the average thickness is more than 2 μm, conformity becomes undesirable, and cracks tend to occur. The thickness is not limited to the foregoing range, as long as the intended effect can be obtained.

Irregularities can be formed on the release layer 103 by dispersing a filler in the release layer 103. Alternatively, irregularities may be formed on the release layer 103 by using, for example, a stamper. Alternatively, a base film 102 may be used that has been processed to have surface irregularities, and the release layer 103 may be formed over these irregularities to provide surface irregularities for the release layer 103. In any case, the outermost surface of the transfer layer 101 can be adjusted in different glossiness levels, from glossy to non-glossy, by adjusting the irregularities on the release layer 103.

The hardcoat layer 104 serves to protect the veneer surface upon being transferred to the surface of the veneer 4. Typically, the hardcoat layer 104 uses an aftercure-type UV curable acrylic resin. It is, however, possible to use other types of acrylic resins, for example, such as a precure-type UV curable acrylic resin, a thermal-drying, single-component acrylic resin, a thermal drying, two-component curable urethane acrylic resin, and an EB (electron beam) curable acrylic resin. These may be appropriately selected according to use. It is also possible to use other materials, as long as the intended effect can be obtained. When using an aftercure-type material, it is typically desirable to apply ultraviolet light or an electron beam in the final step after the wooden decorative panel is molded, and the base film 102 and the release layer 103 are detached. This is because the hardcoat layer 104 becomes more conforming, and less likely to crack when it is not completely cured at the time of molding the wooden decorative panel 107. Curing is not necessarily limited to the final step, and may be performed at the appropriate timing as may be decided according to the intended use.

Desirably, the hardcoat layer 104 is formed in a thickness of 2 μm to 10 μm, more preferably 5 μm to 7 μm. When the thickness of the hardcoat layer 104 is less than 2 μm, the hardcoat layer 104 fails to sufficiently develop its function to protect the veneer surface. When the thickness is more than 10 μm, conformity becomes undesirable such as when being molded in a curved shape. However, the thickness is not necessarily limited to the foregoing ranges, as long as the intended effect can be obtained.

The veneer bonding layer 105 serves to bond the hardcoat layer 104 to veneer. The veneer bonding layer 105 may be, for example, a copolymer resin of vinyl chloride and vinyl acetate, an acrylic resin, or a urethane acrylic resin. Typical examples include thermoplastic resins, two-component curable resins, UV curable resins, thermosetting resins, and EB curable resins. However, the material is not limited to these, and other materials may be used, provided that the material functions to bond the veneer. It is also possible to use an adhesive having a separator on both sides. Such an adhesive also may be used as the veneer bonding layer 105 by bonding one side of the adhesive to the hardcoat layer 104 after peeling off the separator.

The veneer bonding layer 105 has a thickness of desirably 2 μm to 10 μm. With a thickness of less than 2 μm, the veneer bonding layer 105 cannot function to strongly bond the hardcoat layer 104 and the veneer 4, and the adhesion becomes insufficient. It is not meaningful to make the thickness more than 10 μm because it only adds to the manufacturing cost without greatly improving the bonding function. However, the thickness is not particularly limited to the foregoing range, as long as the intended effect can be obtained.

The transfer film 100 may include additional protective functional layers, as needed. For example, a plurality of layers including a UV cut layer for improving lightfastness, an anchor layer for improving the adhesion between layers, and a hydrophilic layer that makes the hardcoat layer surface antifouling may be added to form the transfer film 100. When incorporating these additional layers, the total thickness of the transfer layer 101 is 4 μm to 30 μm, more preferably 5 μm to 20 μm. The layers cannot sufficiently develop even their least required functions when the total thickness is less than 4 μm. With a total thickness of more than 30 μm, the transfer film 100 becomes less conforming to the irregular surface shape of the veneer 4 when being transferred to the veneer 4. This makes it difficult to provide a similar surface shape for the hardcoat layer 104 by reflecting the surface irregularities of the veneer. The transfer layer 101 has a multilayer configuration. The multilayer configuration is not limited, provided that the transfer layer 101 has the veneer bonding layer 105 on the surface to be bonded to the veneer 4, and the hardcoat layer 104 or at least one protective functional layer on the surface opposite the veneer bonding layer 105.

A wooden decorative panel manufacturing process is described below.

FIG. 2 represents a process for manufacturing the wooden decorative panel 107 by bonding the transfer film 100 and the veneer 4 to each other by heat press working.

In the first step S1, a single sheet of transfer film 100, and a single sheet of veneer 4 provided beforehand with a nonwoven fabric 3 are placed between a first press die 200 and a second press die 201 for press working that have been heated to a predetermined temperature. Under the applied heat and pressure, the veneer bonding layer 105 of the transfer film 100 is bonded to the veneer 4.

With regards to the nonwoven fabric 3, the veneer 4 may or may not be provided beforehand with the nonwoven fabric 3 on one of its surfaces. In the case of the latter, a nonwoven fabric 3 that is bondable to the veneer 4, or a nonwoven fabric 3 having an adhesive surface may be disposed on the surface of the veneer 4 opposite the transfer film 100, and may be simultaneously bonded to the veneer 4 in the step of bonding a single sheet of transfer film 100 to the veneer 4. When the veneer 4 is a continuous sheet, the veneer 4 may be bonded to the transfer film 100 being supplied from a roll, instead of a single sheet of transfer film 100.

The dies used for heat press working may be metal dies, wood dies, or resin dies. However, the material is not limited to these, as long as the same effect can be obtained.

S1-2 is a partially enlarged view of step S1, showing a cross section of the transfer film 100 and the veneer 4. As shown in S1-2, the layer of air between the transfer film 100 and the veneer 4 placed between the first press die 200 and the second press die 201 is released to outside along the surface of the veneer 4 under the pressure of the first press 200 pressing the veneer 4 from the transfer film 100 side. Here, the air inside the vessels 13 present in the surface of the veneer 4 is also released. The vessels 13 of the veneer 4 are a porous space where the wood fiber is sparse. In the thermal bonding of the veneer bonding layer 105 of the transfer film 100 with the veneer 4 under the pressure of the first press die 200, the veneer bonding layer 105 of the transfer film 100 softens under the conducted heat from the first press die 200, and partially enters the vessels 13 of the veneer 4. Here, the air inside the vessels 13 of the veneer 4 is active under the heat of the first press die 200 and the second press die 201, and the veneer bonding layer 105 pushes out a part of the air inside the vessels 13 of the veneer 4 as the veneer bonding layer 105 of the transfer film 100 enters the vessels 13. As shown in S1-2, the air moves out of the vessels 13 in the direction of arrow, and a part of the air in the vessels 13 is released from the veneer 4 on the side of the second press die 201. In response, a part of the veneer bonding layer 105 gradually enters the vessels 13 of the veneer 4, carrying along with it the other layers of the transfer film 100 present on the vessels 13 of the veneer 4. After sufficient heat and pressure is applied to the transfer film 100 and to the veneer 4 through the wood surface in step S1, the first press die 200 is moved up from the transfer film 100 in step S2. Here, as a result of the heat press working in step S1, the veneer bonding layer 105 of the transfer film 100 partially enters the vessels 13 of the veneer 4 as illustrated in S2-2, and the other layers of the transfer film 100 slightly deform by being drawn into the shape created by the entry of the veneer bonding layer 105 in the vessels 13 of the veneer 4. As a result, the irregular shape formed by the vessels 13 in the surface of the veneer 4 is reflected in a similar shape in the transfer layer of the transfer film 100.

In the last step S3, the wooden decorative panel 107 as a combined unit of the transfer film 100 and the veneer 4 is taken out of the dies.

The surface of the release layer 103 in the transfer film 100 has an indefinitely large number of irregularities of a shape smaller than the irregularities formed by the vessels 13 of the veneer 4. Upon indirectly applying heat and pressure to the veneer 4 with the first press die 200 through the base film 102 of the transfer film 100, the irregularities (not illustrated) formed in the surface of the release layer 103 of the transfer film 100 spread the pressure exerted on the surface of the veneer 4. This prevents the irregularities formed by the vessels 13 in the surface of the veneer 4 from easily deforming under the applied pressure of the heat press.

Because the irregularities formed by the vessels 13 in the surface of the veneer 4 are prevented from easily deforming, the transfer layer 101 of the transfer film 100 can conform to the shape of the irregularities formed by the vessels 13 of the veneer 4, and the irregularities formed by the vessels 13 of the veneer 4 are transferred in a similar shape to the surface of the transfer layer 101. To make the transfer film 100 more conforming to the veneer 4, the first press die 200 and the second press die 201 used for heat press working may be made of non-metallic materials, for example, such as fluororesin materials, and heat-resistant resin materials. Press dies made of such materials are more flexible than metal press dies, and make the transfer film 100 more conforming to the veneer 4 under applied heat and pressure. The transfer film 100 can more easily conform to the veneer 4 in heat press working when the veneer 4 is subjected beforehand to resin impregnation because the resin loosens the wood fibers in the veneer 4, and makes the veneer 4 flexible.

The resin used for the impregnation of the veneer 4 may be, for example, polyethylene glycol, an acrylic resin, or a urethane resin, and may be appropriately selected from these and other materials according to use. It is also possible to use a thermoplastic resin, a thermosetting resin, a two-component curable resin, a UV/EB curable precure resin, and a UV/EB curable aftercure-type resin. The resin impregnation is not necessarily required, and may be performed as needed.

The bonding of the transfer film 100 and the veneer 4 is not limited to heat press working, and these may be bonded to each other by using a non-contact heating and pressurizing method, for example, such as vacuum molding, pressure molding, and vacuum pressure molding, or by using a heating and pressurizing method using a heat laminator.

In the case of vacuum pressure molding, a vacuum created by vacuuming makes it easier to release the air inside the vessels 13 of the veneer 4 in S1-2 and S2-2, and to draw a part of the veneer bonding layer 105 of the transfer film 100 into the vessels 13 of the veneer 4. The transfer film 100 can therefore more easily conform to the shape of the irregularities formed by the vessels 13 in the surface of the veneer 4, and more distinct irregularities can be formed in the surface of the transfer layer 101 of the transfer film 100.

The wooden decorative panel 107 produced in the manner described above is described below in detail.

The wooden decorative panel 107 includes the transfer film 100, without the base film 102 and the release layer 103. The wooden decorative panel 107 has irregularities 106, which are formed on the outermost surface of the transfer layer 101 as a result of the irregularities formed by the vessels 13 in the surface of the veneer 4 being transferred in a similar shape to the transfer layer 101 of the transfer film 100.

Accordingly, the hardcoat layer 104 formed on the surface of the veneer 4 can maintain the natural surface texture and feel of the veneer 4. In addition to the irregularities similar in shape to the vessels 13 of the veneer 4, the surface of the hardcoat layer 104 has irregularities transferred from the release layer 103, smaller than the irregularities of the vessels 13 of the veneer 4. The hardcoat layer 104 therefore has a surface that appears like the natural non-glossy surface of the veneer 4.

The wooden decorative panel 107 can therefore replicate the natural matte surface texture of the veneer 4. The wooden decorative panel 107 has a nonwoven fabric 3 layer on the side opposite the hardcoat layer 104. However, abase film, or a porous nonwoven fabric layer imparted with an adhesive function may be formed as a support, instead of the nonwoven fabric 3. Different types of supports may be used for different applications.

The veneer 4 has an average thickness of 0.1 mm to 0.7 mm, more preferably 0.2 mm to 0.6 mm. When thinner than 0.1 mm, the veneer 4 tends to crack in handling. When the veneer 4 is thicker than 0.7 mm, the conformity of the veneer 4 as a sheet becomes undesirable for molding. However, the veneer thickness is not limited to the foregoing thickness range, as long as the intended effect can be obtained.

The following describes the manufacturing process by which the wooden decorative panel 107 is transferred to a surface of a molding by insert molding, with reference to FIGS. 4A to 4C.

As shown in FIG. 4A, in step A1, the wooden decorative panel 107 is disposed between a movable press die 1A and a fixed press die 2A for preforming. In this example, the wooden decorative panel 107 is a single sheet of panel. The wooden decorative panel 107 is disposed in such an orientation that the transfer layer 101 faces the fixed press die 2A.

In step A2, the movable press die 1A is moved, and the dies are closed to preform the wooden decorative panel 107. In step A3, the movable press die 1A is returned to its original position, and the preformed wooden decorative panel 107 is removed from the dies. Here, the wooden decorative panel 107 can more easily conform to the preform dies at the time of preforming since the wood fibers in the veneer 4 of the decorative panel 107 are loosened by moistening the wooden decorative panel 107. It is also possible to moisten the wooden decorative panel 107 with moisture or water vapor at the time of preforming to loosen the wood fibers in the veneer 4 of the wooden decorative panel 107, and make the wooden decorative panel 107 flexible.

As shown in FIG. 4B, in step B1, the unnecessary portions at the edges of the wooden decorative panel 107 are trimmed with a cutter 108. The wooden decorative panel 107 is completed in step B2 upon finishing trimming.

As shown in FIG. 4C, in step C1, the base film 102 is peeled off from the preformed wooden decorative panel 107 obtained in step B2, and the preformed wooden decorative panel 107 is disposed in a movable die 2B for insert molding. Here, the wooden decorative panel 107 is disposed in such an orientation that the veneer 4 faces the movable die 2B on the transfer layer 101 side. The movable die 2B has a suction hole (not illustrated) formed therein, and the wooden decorative panel 107 is drawn to the movable die 2B by suction.

In step C2, the movable die 2B is moved toward the fixed die 1B, and the dies are closed.

In step C3, an injection-molding resin is injected into the dies through the gate 109 of the fixed die 1B, and a layer 1 of the injected injection-molding resin is bonded to the first bonding layer 2 provided beforehand on the surface of the wooden decorative panel 107 opposite the transfer layer 101 of the veneer 4. This example is based on the first bonding layer 2 being provided separately from the nonwoven fabric 3. However, the same bonding effect can be achieved by imparting adhesiveness to the nonwoven fabric 3 with an adhesive applied to one side of the nonwoven fabric 3, or with a resin impregnated in the nonwoven fabric 3 and that turns into an adhesive under the heat of the injection-molded resin layer 1.

In step C4, the dies open, and the insert molding 110 as a combined unit with the wooden decorative panel 107 is removed from the dies using an ejector pin (not illustrated).

For mass production, the foregoing steps are repeated.

In the insert molding steps C1 to C3, the wooden decorative panel 107 may be moistened to add flexibility, and to improve the conformity to the movable die 2B, as in the preforming.

In step C1, the wooden decorative panel 107 is disposed in the movable die 2B after removing the base film 102. However, in order to make the surface irregularities of the wooden decorative panel 107 more accurate, the wooden decorative panel 107 is insert molded without removing the base film 102 of the transfer film 100, after the transfer film 100 and the veneer 4 are bonded to each other in the heat press working in steps S1 and S2. After the insert molding, the base film 102 attached to the release layer 103 is detached from the insert molding. In this case, the irregularities on the transfer layer 101 do not directly contact the surface of the insert-molding die at the time of insert molding, and become less likely to deform, making it possible to provide an insert molding 110 that accurately keeps the shape of the irregularities.

In order to make the surface irregularities of the wooden decorative panel 107 more appealing, at least one of the fixed press die 2A used in the preforming steps A1 to A3 of FIG. 4A, and the movable die 2B used in the insert molding steps C1 to C4 of FIG. 4C may be a die that has an embossed woodgrain surface on the transfer layer 101 side of the veneer 4. In this way, the woodgrain embossment on the die surface can, either in part or as a whole, transfer to the surfaces of the transfer layer 101 and the veneer 4 under the heat and pressure of the preforming in the preforming steps, or under the pressure of the injection in the insert molding in the insert molding steps, and the transfer film 100 and the veneer 4 can have surfaces that fully or partially reflect the shape of the woodgrain embossment formed on the plate or the die surface. With this method, an insert molding can be produced that has a woodgrain-like surface designed with woodgrain embossment that realistically replicates the feel of wood.

With the wooden decorative panel, the wooden decorative panel manufacturing method, and the method for manufacturing a molding using the wooden decorative panel according to the embodiment of the present disclosure, a veneer surface can be imparted with the durability necessary for use in an industrial product, without losing the feel and the appearance of the natural irregularities of a veneer produced by slicing natural wood. The method also enables production of a wooden decorative panel that keeps the natural texture of wood, both at low cost and in stable quality.

Second Embodiment

A process for manufacturing a wooden decorative panel 107 according to Second Embodiment of the present disclosure is described below, with reference to FIG. 5.

In the following descriptions, the same constituting elements described in FIG. 1 to FIG. 4C will be referred to by the same reference numerals.

Figure 5:
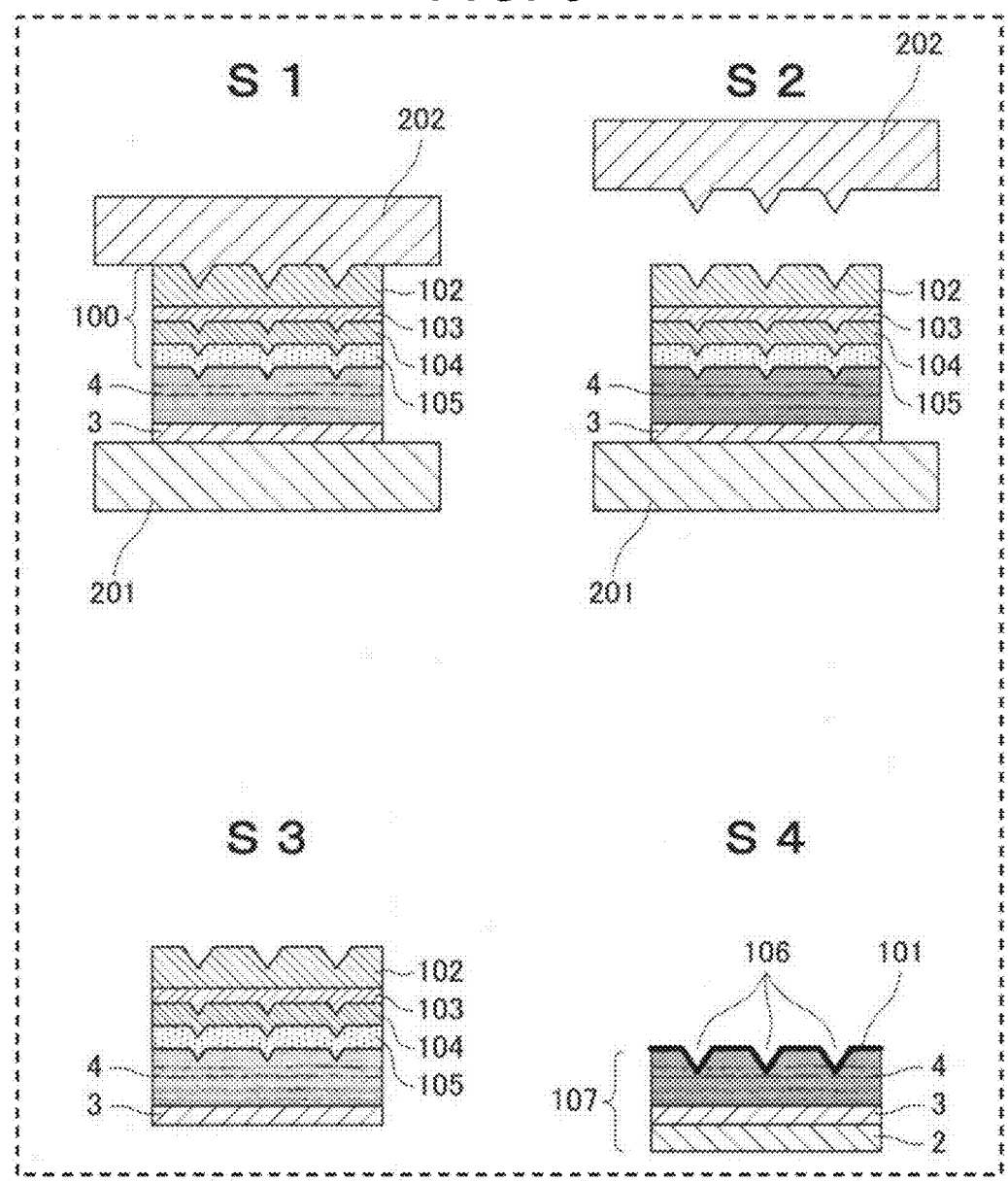
FIG. 5 is an explanatory diagram of a wooden decorative panel manufacturing method of Second Embodiment of the present disclosure.

FIG. 5 represents a process by which the transfer film 100 and the veneer 4 are bonded to each other by heat press working to manufacture a wooden decorative panel 107, as in FIG. 2.

In step S1, the first press die 202 and the second press die 201 for press working are heated to a predetermined temperature, and a sheet of transfer film 100, and a sheet of veneer 4 are placed between these dies. The first press die 202 has surface embossment. The embossment is not particularly limited. However, the embossment can blend into the natural grain of the veneer 4 when it is formed on the surface of the first press die 202 in a shape and a pattern that resemble the grain irregularities in the surface of the veneer 4. In this way, the natural grain of the veneer 4 can be expressed with more accent.

In step S1, the veneer bonding layer 105 of the transfer film 100 is bonded to the veneer 4 under applied heat and pressure, and the embossed shape on the surface of the first press die 202 is transferred to the surfaces of the transfer layer 101 and the veneer 4 via the transfer film 100. Here, the transfer film 100 and the veneer 4 may be heat pressed using a first plate and a second plate, instead of the first press die 202 and the second press die 201.

After the transfer film 100 and the veneer 4 are sufficiently heated and pressed, the first press die 202 is moved in step S2 to release the pressure applied in step S1.

In step S3, the wooden decorative panel 107 as a combined single unit of the transfer film 100 and the veneer 4 is removed from the dies.

In the manufacturing process of Second Embodiment, heat and pressure is indirectly applied to the veneer 4 through the base film 102 of the transfer film 100. This, together with the shape of the irregularities formed in the release layer 103 of the transfer film 100, causes the applied pressure on the surface of the veneer 4 to spread apart over the irregularities of different sizes, and the irregularities due to the vessels in the surface of the veneer 4 are less likely to deform.

In this way, the transfer layer 101 of the transfer film 100 transfers by conforming to the shape of the surface irregularities of the veneer 4, and the embossed shape formed on the surface of the first press die 202 is also transferred. The embossed shape of the first press die is therefore in the surface of the veneer 4 through the transfer layer 101 after the base film 102 and the release layer 103 of the transfer film 100 are detached from the wooden decorative panel 107 in step S4, and forms deep irregularities in the surface of the veneer 4. The irregularities created by the embossed shape of the first press die 202 also blend into a part of the natural irregularities due to the vessels of the veneer 4.

Embossing of the first press die 202 thus creates deeper irregularities in the surface of the veneer 4, and the wooden decorative panel 107 can have a feel and an appearance that accentuate the natural texture of veneer.

With regards to the size of the irregularities due to the vessels in the surface of the veneer 4, and the irregularities due to the embossed shape on the surface of the first press die 202, it is desirable to make the embossed irregularities of the first press die 202 narrower than the irregularities due to the vessels in the surface of the veneer 4. When the irregularities due to the embossment of the first press die 202 are wider than the irregularities due to the vessels in the surface of the veneer 4, the irregularities due to the embossment of the first press die 202 flatten the irregularities due to the vessels in the surface of the veneer 4, and create a blur shape in the irregularities due to the natural vessels in the surface of the veneer 4. This makes the surface irregularities of veneer 4 unnatural. The irregularities due to the vessels in the surface of the veneer 4 have random lengths, and, accordingly, the length of the irregularities due to the surface embossment of the first press die 202 is not particularly limited, and may be set to any length, provided that it looks natural. The irregularities due to the embossment of the first press die 202 may have any depth, provided that the first press die 202 with the embossed irregularities can be released from the transfer film 100 after the heat press working without breaking the veneer 4.

Heat and cool press working may be adopted when a faster transfer rate is desired for the transfer of the embossment of the first press die 202. In heat and cool press working, the embossment of the first press die 202 penetrates in the surface of the veneer 4 via the transfer film 100. Here, because the first press die 202 has high temperature, the embossment of the first press die 202 can more easily penetrate in the surface of the veneer 4. Upon finishing the transfer of the embossment of the first press die 202 to the veneer 4 after a certain time period of heat pressing, the temperature of the first press die 202 is immediately lowered while maintaining the applied pressure from the first press die. In this way, the embossment of the first press die that has penetrated in the veneer 4 via the transfer film 100 cools before the first press die 202 opens, and the embossed shape of the first press die 202 transferred to the surface of the veneer 4 becomes fixed in the surface of the veneer 4. Once the embossed shape of the first press die 202 is transferred and fixed in the surface of the veneer 4, the surface of the veneer 4 does not easily return to the original shape when the first press die 202 is released from the transfer film 100. In this way, the embossment of the first press die 202 can be transferred to the surface of the veneer 4 with high accuracy.

The present disclosure has a wide range of applications as a technique that imparts a wood-like design to a resin component in applications such as exterior casings of home electronics and mobile devices, and interior components of automobiles.

What is claimed is:

1. A wooden decorative panel comprising:
a veneer made from natural wood and having a plurality of surface irregularities due to vessels of the wood; and
a transfer layer transferred from a transfer film and bonded to a surface of the veneer,
the transfer layer having surface irregularities that are similar in shape to the plurality of irregularities due to the vessels,
wherein the transfer layer has a multilayer configuration that includes a veneer bonding layer on the surface directly bonded to the veneer, and a hardcoat layer or at least one protective functional layer on the surface opposite the veneer bonding layer and directly bonded to the veneer bonding layer.

2. The wooden decorative panel according to claim 1, wherein the hardcoat layer or the protective functional layer is made of an ultraviolet curable resin or an electron beam curable resin.

3. The wooden decorative panel according to claim 2, wherein the transfer layer has a total thickness of 4 μm or more and 30 μm or less.

4. The wooden decorative panel according to claim 3, wherein inside of the veneer is impregnated with resin.

5. An insert molding comprising:
an injection-molded resin; and
the wooden decorative panel of claim 4.

6. The wooden decorative panel according to claim 1, wherein the at least one protective functional layer is selected from the group consisting of a UV cut layer for improving lightfastness, an anchor layer for improving the adhesion between layers, and a hydrophilic layer that makes the hardcoat layer surface antifouling.

7. A method for manufacturing a wooden decorative panel according to claim 1, the method comprising:
placing a transfer layer-side of a transfer film on one surface of a veneer made from natural wood and having a plurality of surface irregularities due to vessels of the wood; and
bonding the transfer layer of the transfer film to the surface of the veneer so as to form irregularities in a surface of the transfer layer in a shape similar to the surface irregularities of the veneer due to the vessels of the wood.

8. The method according to claim 7, wherein the surface irregularities similar in shape to the surface irregularities of the veneer are formed in the surface of the transfer layer by bonding the transfer layer to the veneer surface using a technique selected from heat press working, vacuum molding, pressure molding, vacuum pressure molding, and heat lamination after the transfer layer-side of the transfer film is placed on one surface of the veneer.

9. The method according to claim 8, wherein the outermost surface of the transfer layer to be transferred to the surface of the veneer has a roughness that is adjusted by varying a surface roughness of a base film on the side facing the transfer layer of the transfer film, or by varying a surface roughness of a release layer on the side facing the transfer layer formed on the base film.

10. The method according to claim 9, wherein the surface roughness of the base film on the side facing the transfer layer of the transfer film, or the surface roughness of the release layer on the side facing the transfer layer formed on the base film is smaller than a roughness of the surface irregularities formed by the vessels in the surface of the veneer.

11. The method according to claim 8,
wherein the transfer film and the veneer are bonded to each other by heat press working that applies pressure on the transfer film using a die having embossed surface irregularities, and
wherein the embossed surface irregularities of the die are woodgrain embossment, and the woodgrain embossment on the die surface is transferred to surfaces of the transfer layer and the veneer by partially biting into the surface of the transfer layer of the transfer film, and the surface of the veneer, and penetrate into a part of the surface irregularities of the veneer.

12. A method for manufacturing an insert molding, the method comprising:
preforming by heat press working of the wooden decorative panel manufactured by the method of claim 8; and
forming a molded resin layer by insert molding that injects resin to a first bonding layer or a functional bonding surface formed on the surface of the veneer opposite the surface on which the transfer layer is transferred, so as to obtain an insert molding having formed thereon the veneer that includes the transfer layer.

13. The method according to claim 12, wherein the die used for the preforming and/or the insert molding step has woodgrain embossment on the surface that contacts the transfer layer-side of the veneer, and the woodgrain embossment on the die surface is transferred to the transfer layer-side of the veneer in the preforming and/or the insert molding step.

14. The method according to claim 13, wherein the base film of the transfer film is removed from the surface of the wooden decorative panel after the completion of the insert molding.

* * * * *